United States Patent
Hokenson

(10) Patent No.: US 7,694,023 B1
(45) Date of Patent: Apr. 6, 2010

(54) ROUTING A PROCESSOR COMMUNICATION

(75) Inventor: Gary L. Hokenson, St. Paul, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 967 days.

(21) Appl. No.: 11/338,210

(22) Filed: Jan. 24, 2006

(51) Int. Cl.
H04B 10/20 (2006.01)

(52) U.S. Cl. .......... 709/249; 709/239; 398/57; 398/58; 370/216; 370/225; 370/227

(58) Field of Classification Search .......... 370/216, 370/225, 227; 709/239; 714/1; 398/57, 398/58
See application file for complete search history.

(56) References Cited

U.S. PATENT DOCUMENTS

| 4,575,842 A | | 3/1986 | Katz et al. |
|---|---|---|---|
| 5,088,090 A | * | 2/1992 | Yacoby ............... 370/402 |
| 5,182,808 A | | 1/1993 | Bagnoli et al. |
| 5,896,370 A | | 4/1999 | Eckhoff et al. |
| 6,148,410 A | * | 11/2000 | Baskey et al. ............ 714/4 |
| 6,195,704 B1 | * | 2/2001 | Suita ..................... 709/239 |
| 6,285,656 B1 | * | 9/2001 | Chaganty et al. ......... 370/228 |
| 6,320,867 B1 | | 11/2001 | Bellenger et al. |
| 6,338,095 B1 | | 1/2002 | Yasuda et al. |
| 6,343,086 B1 | | 1/2002 | Katz et al. |
| 6,370,583 B1 | | 4/2002 | Fishler et al. |
| 6,510,164 B1 | * | 1/2003 | Ramaswamy et al. ...... 370/466 |
| 6,778,535 B1 | * | 8/2004 | Ash et al. ............ 370/395.21 |
| 6,792,174 B1 | * | 9/2004 | Ramaswami ............ 385/17 |
| 6,900,931 B1 | * | 5/2005 | Sridhar et al. ........... 359/337.1 |
| 7,184,663 B2 | * | 2/2007 | Kinoshita et al. ........... 398/59 |
| 7,274,869 B1 | * | 9/2007 | Pan ........................... 398/5 |
| 2002/0131362 A1 | * | 9/2002 | Callon .................. 370/216 |
| 2004/0165525 A1 | * | 8/2004 | Burak .................. 370/228 |
| 2005/0135254 A1 | * | 6/2005 | Taylor et al. ............ 370/237 |
| 2007/0076590 A1 | * | 4/2007 | Galpin et al. ............ 370/216 |

* cited by examiner

Primary Examiner—Ashok B Patel
Assistant Examiner—Andrew Goldberg
(74) Attorney, Agent, or Firm—Brooks, Cameron & Huebsch, PLLC

(57) ABSTRACT

A method embodiment includes determining whether a communication received from a first processor connected to a network interface unit is intended for a second processor connected to the network interface unit. The method embodiment also includes selecting a first communication path between a route through a switch and a route directly to the second processor through which to route the communication from the network interface unit to the second processor. The method embodiment further includes routing the communication from the network interface unit to the second processor through the first communication path.

19 Claims, 5 Drawing Sheets

ROUTING A PROCESSOR COMMUNICATION

FIELD OF THE DISCLOSURE

The present disclosure generally relates to routing a communication. And, in particular, the present disclosure relates to routing a processor communication.

BACKGROUND

In routing a processor communication, a number of computing devices are typically connected together in a network so the networked computing devices can communicate with each other. Various types of networks can connect computing devices in various areas (e.g. a local area network (LAN)). These networks can be provided in various ways (e.g. a client-server network). Networks can also utilize various communication protocols (e.g. Ethernet).

Each computing device in a network includes one or more processors. A processor can typically receive, process, and/or transmit various data. A processor can also typically communicate with another processor by transmitting data to and/or receiving data from the other processor. When a processor in a first computing device communicates with a processor in a second computing device, the first and the second computing devices are considered to be communicating with each other.

Various network devices allow processors in different networked computing devices or multiple processors in a computing device to communicate with each other. One type of network device is a network interface unit. A network interface unit can perform various network interface functions, such as facilitating communication between multiple processors. Another network device is a network data switch. A switch can perform various network switching functions, such as directing communications to and from processors.

A computing device network can include a first computing device that includes a first processor, a second computing device that includes a second processor, a network interface unit, and a network data switch. In such networks, the first computing device and the second computing device can each be in communication with the network interface unit, which is in communication with the network data switch. In order for the first processor to transmit data to the second processor, the first processor transmits data to the network interface unit. The data is then transmitted to the network data switch. The network data switch transmits the data back to the network interface unit, which transmits the data to the second processor.

Similarly, in this approach, for the second processor to transmit data to the first processor, the second processor transmits data to the network interface unit. The data is then transmitted to the network data switch. The network data switch transmits the data back to the network interface unit, which transmits the data to the first processor.

Transmitting data from the first processor to the second processor, using this approach, can be slow since the data is transmitted to the network data switch, switched, and transmitted from the network switch. Also, communication using this approach can be prone to disruption, since a hardware failure between the network interface unit and the network data switch can disrupt communication between a first processor and a second processor.

SUMMARY

Embodiments of the present disclosure provide methods, computing device readable media, devices, and systems, for routing a processor communication. For example, the present disclosure includes method embodiments for routing a processor communication.

In various embodiments, a method embodiment for routing a processor communication can include determining whether a communication is intended for a processor. For example, such determinations can include determining whether a communication received from a first processor connected to a network interface unit is intended for a second processor connected to the network interface unit. In some embodiments, this determination can identify that the communication is intended for the second processor or a determination that the communication is not intended for the second processor.

In various embodiments, the first and second processors can be in the same computing device. In some embodiments, the first processor can be in a first computing device and the second processor can be in a second computing device. In such embodiments, the methods can be accomplished by one or more of the computing devices.

Method embodiments for routing a processor communication can include determining whether a communication path from a network interface unit to a processor is available. In some embodiments, the determination can include determining whether a second communication path from a network interface unit to a second processor is available. This example determination can identify that the second communication path from the network interface unit through a network device to the second processor is unavailable.

In such embodiments, the second communication path can be from the network interface unit through another network device (e.g. a network data switch) to the second processor. Such determinations can be at least a partial basis for selecting a communication path.

Method embodiments can include selecting a communication path through which to route a communication. For example, selecting can include selecting a first communication path between a route though a switch and a route directly to the second processor through which to route a communication from a network interface unit to a second processor. In such embodiments, selecting can include selecting, as the first communication path, a path from the network interface unit directly to the second processor, based, at least in part, on a determination that the communication is intended for the second processor.

In a method embodiment of the present disclosure, if a communication is not intended for a second processor, the embodiment can include determining whether a route from a first processor to a switch is available, and if the route is unavailable, determining whether a route from the second processor to the switch is unavailable. If the route from the second processor to the switch is available, such an embodiment can include routing the communication to the second processor for routing to the switch.

In various embodiments, selecting can include selecting as the first communication path a path from the network interface unit directly to the second processor, based, at least in part, on a determination that a second, different, communication path is unavailable.

Various method embodiments can also include routing a communication through a communication path. As an example, routing can include routing a communication from a network interface unit to a second processor through a first communication path. In some embodiments, the first communication path can be selected as described above.

In some method embodiments, the method can include determining how a processor communication is routed. For example, determining how a processor communication is routed can include determining that a processor communication is routed to a processor that is directly connected to a network interface unit.

In such an embodiment, the determination can be performed in various ways, such as by using a destination address in the processor communication. Determining how a processor communication is routed can, in some embodiments, include determining that a processor communication is routed to a processor on a first route that travels through the network interface unit at least twice.

Method embodiments can include rerouting a processor communication. For example, in some embodiments, the method can include determining that a second route to a processor that travels through the network interface unit only once is available.

In various embodiments, the method can include, rerouting a processor communication to a second, different, route to a processor. In these embodiments, rerouting can be performed in various ways, such as by changing a destination address in a processor communication. In various embodiments, each of the method embodiments described herein can be provided on a computer readable medium.

The present disclosure also includes a number of device embodiments. For example, a network interface device embodiment can include one or more processors, memory connected to a processor, and/or executable instructions storable in the memory and executable by the processor.

A processor of a network interface device can include one or more of a variety of different computing device processing component types. For example, a processor can include a field programmable gate array, an application specific integrated circuit, a configurable microcontroller, and/or a complex programmable logic device, among other component types.

A processor can execute instructions to receive, recognize, and/or reroute a signal. For example, executable instructions can include instructions for a network interface device to receive a signal that is routed through the network interface device and through another network device. Executable instructions can include, for example, instructions for a network interface device to recognize that a signal is routed to a second processor that is directly connected to the network interface device. In various embodiments, executable instructions can include instructions for a network interface device to reroute a signal from a network interface device directly to a second processor that is directly connected to the network interface device. A signal can be any type of transmission of information.

The present disclosure also includes a number of system embodiments. For example, system embodiments can include a first computing device with a first processor, a second computing device with a second processor, a network data switch, and a network interface unit in communication with the first processor, the second processor, and the network data switch.

In such embodiments, the network interface unit can include a third processor, a memory connected to the third processor, and executable instructions storable in the memory and executable by the third processor. These instructions, in some embodiments, can be executable to identify that a communication that has been transmitted by the first processor and into the network interface unit, is directed to the second processor. Such communications can, for example, include a number of executable instructions and/or data.

Embodiments can include instructions that can be executable to redirect the communication directly from the network interface unit to the second processor. In various system embodiments, such instructions can be executable to redirect the communication by using one or more programmable interconnects and/or one or more programmable switches, included in the network interface unit.

DETAILED DESCRIPTION

The present disclosure includes a number of method, computing device readable media, device, and system embodiments for routing processor communications. Embodiments of the present disclosure will now be described in relation to the accompanying drawings, which will at least assist in illustrating the various features of the various embodiments.

Embodiments of the present disclosure can be performed by software, firmware, hardware, application modules, and the like. These embodiments can use executable instructions resident on and/or executable by ASICs, devices, systems, or networks shown herein or otherwise. The embodiments of the present disclosure are not limited to any particular operating environment or to instructions written in any particular programming language. Software, firmware, and/or processing modules, suitable for carrying out embodiments of the present disclosure, can be resident on one or more devices or in one or more locations.

Figure 1:
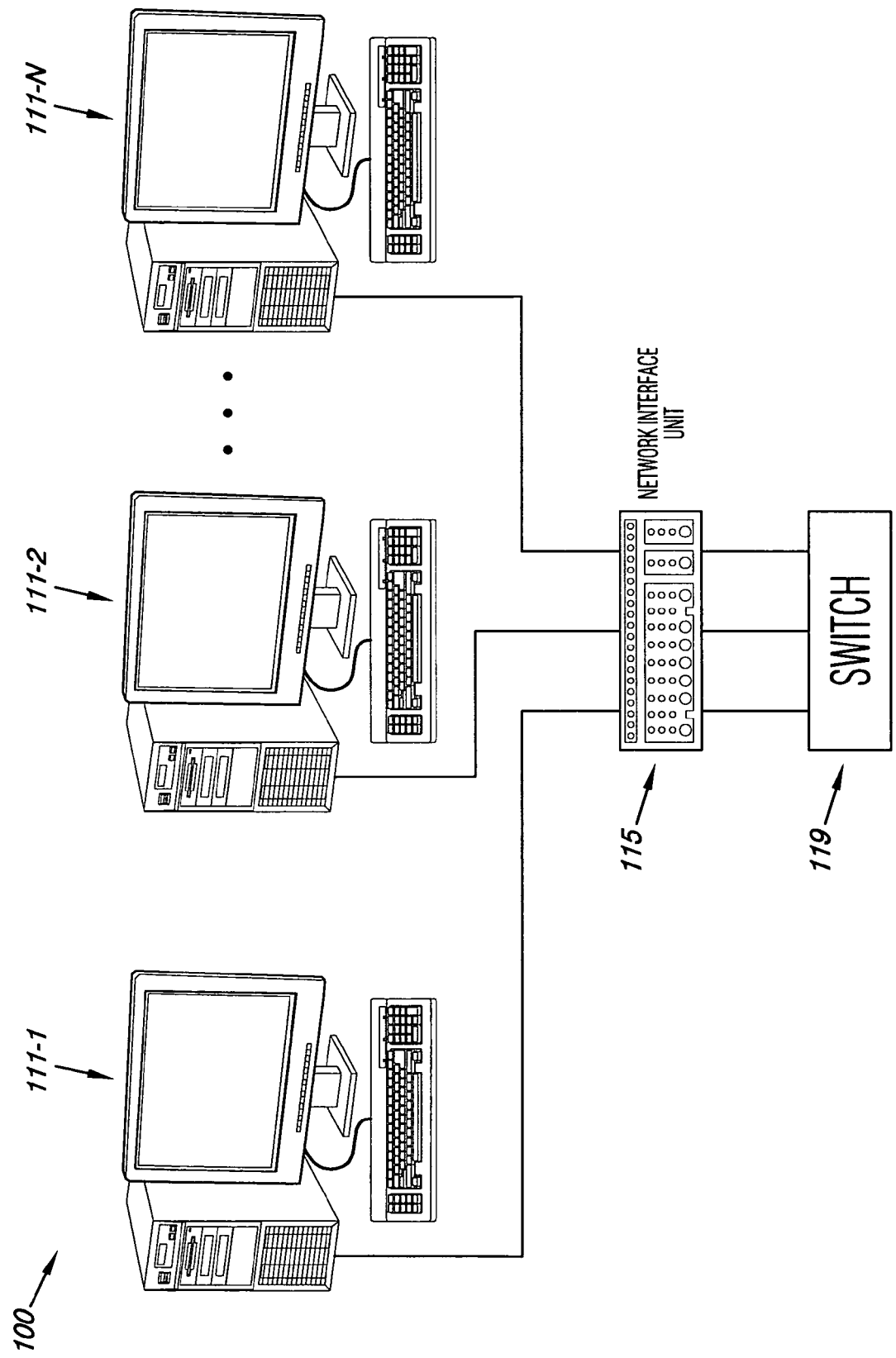
FIG. 1 is an illustration of a system embodiment showing connections between a number of system components.

FIG. 1 is an illustration of a system embodiment showing connections between a number of system components. In the embodiment of FIG. 1, the network 100 includes a first computing device 111-1, a second computing device 111-2, an Nth computing device 111-N (where "N" can represent any number), a network interface unit 115, and a network data switch 119. In this embodiment, the first computing device 111-1 includes a first processor, the second computing device 111-2 includes a second processor, and the Nth computing device 111-N includes an Nth processor.

The elements of the network 100 can perform various functions. For example, each of the processors in the computing devices 111-1 through 111-N can receive, process, and/or transmit various information, such as a communication, and/or signal, between network components (e.g., processors, switches, computing devices, and/or interface units, among other components).

Figure 4C:
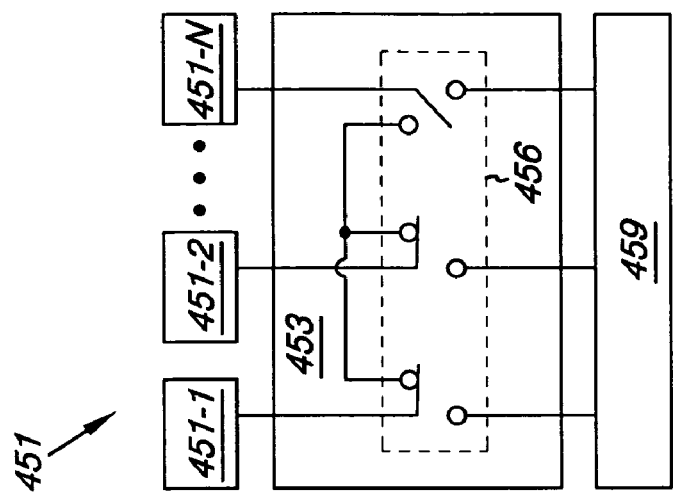
FIG. 4C is a functional diagram illustrating another system embodiment.
Figure 4B:
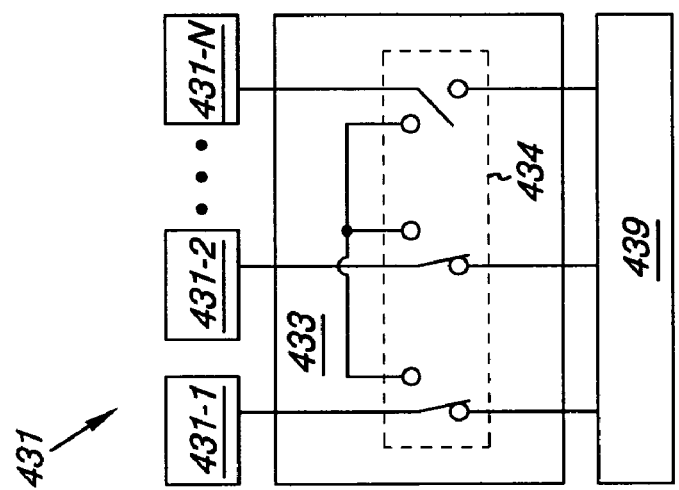
FIG. 4B is a functional diagram illustrating another system embodiment.
Figure 4A:
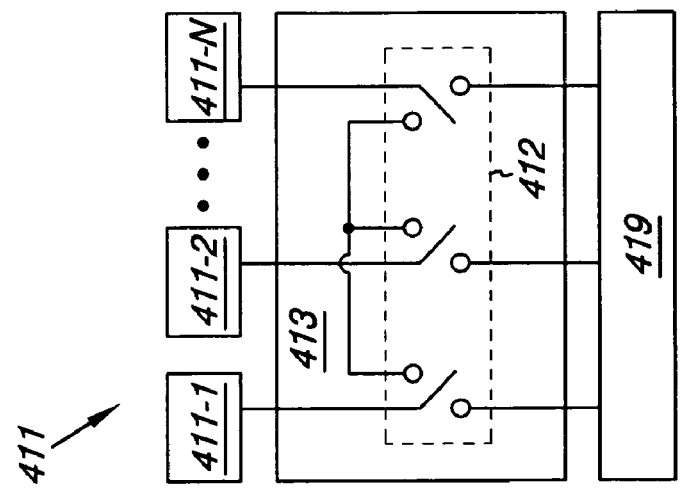
FIG. 4A is a functional diagram illustrating a system embodiment.

The network interface unit 115 can facilitate communication between each of the processors in the computing devices 111-1 through 111-N, such as through interconnects and/or switches in the network interface unit 115 or associated therewith, as described further in connection with FIGS. 4A-4C. The network interface unit 115 can also receive, process, and/or transmit various types of information, as discussed with respect to the processors above.

The network data switch 119 can perform various switching functions, such as directing communications received from or transmitted to the network interface unit 115. The network data switch 119 can also receive, process, and/or transmit various types of information, such as a communication and/or a signal.

The elements of the computing device network 100 are associated in various ways. The processor in each of the computing devices 111-1 through 111-N is connected to the network interface unit 115 through an independent communication path or route.

As illustrated in FIG. 1, a processor can be directly connected to the network interface unit. For example, the first processor in the first computing device 111-1 is directly connected to the network interface unit 115. The second processor in the second computing device 111-2 is directly connected to the network interface unit 115. The Nth processor in the Nth computing device 111-N is directly connected to the network interface unit 115. As a result, each of the processors in the computing devices 111-1 through 111-N can communicate with the network interface unit 115.

The network interface unit 115 is connected to the network data switch 119, through a number of communication paths or routes. These communications can also be direct. As a result, the network interface unit 115 can communicate with the network data switch 119.

The connections in the network 100 can form various communication paths or routes between the processors in each of the computing devices 111-1 through 111-N. For example, a communication path from the first processor in the first computing device 111-1 to the second processor in the second computing device 111-2 can include the communication path between the first computing device 111-1 and the network interface unit 115, a communication path between the network interface unit 115 and the network data switch 119, a communication path between the network data switch 119 and the network interface unit 115, and a communication path between the network interface unit 115 and the second processor in the second computing device 111-2. In this way, the first processor in the first computing device 111-1 can transmit a communication through this communication path to the second processor in the second computing device 111-2.

Also as an example, a communication path from the first processor in the first computing device 111-1 to the second processor in the second computing device 111-2 can include the communication path between the first computing device 111-1 and the network interface unit 115 and a communication path between the network interface unit 115 and the second processor in the second computing device 111-2. In such embodiments, the first processor in the first computing device 111-1 can also transmit a communication through a communication path to the second processor in the second computing device 111-2. In an embodiment, such as shown in FIG. 1, the network 100 can include a number of communication paths or routes between and/or through various elements in the network 100.

The processors in each of the computing devices 111-1 through 111-N can communicate with each other through various communication paths or routes in the network 100. A particular communication path or route through the network interface unit 115 can be selected, by executing executable instructions, as described in connection with FIGS. 4-5.

Figure 2:
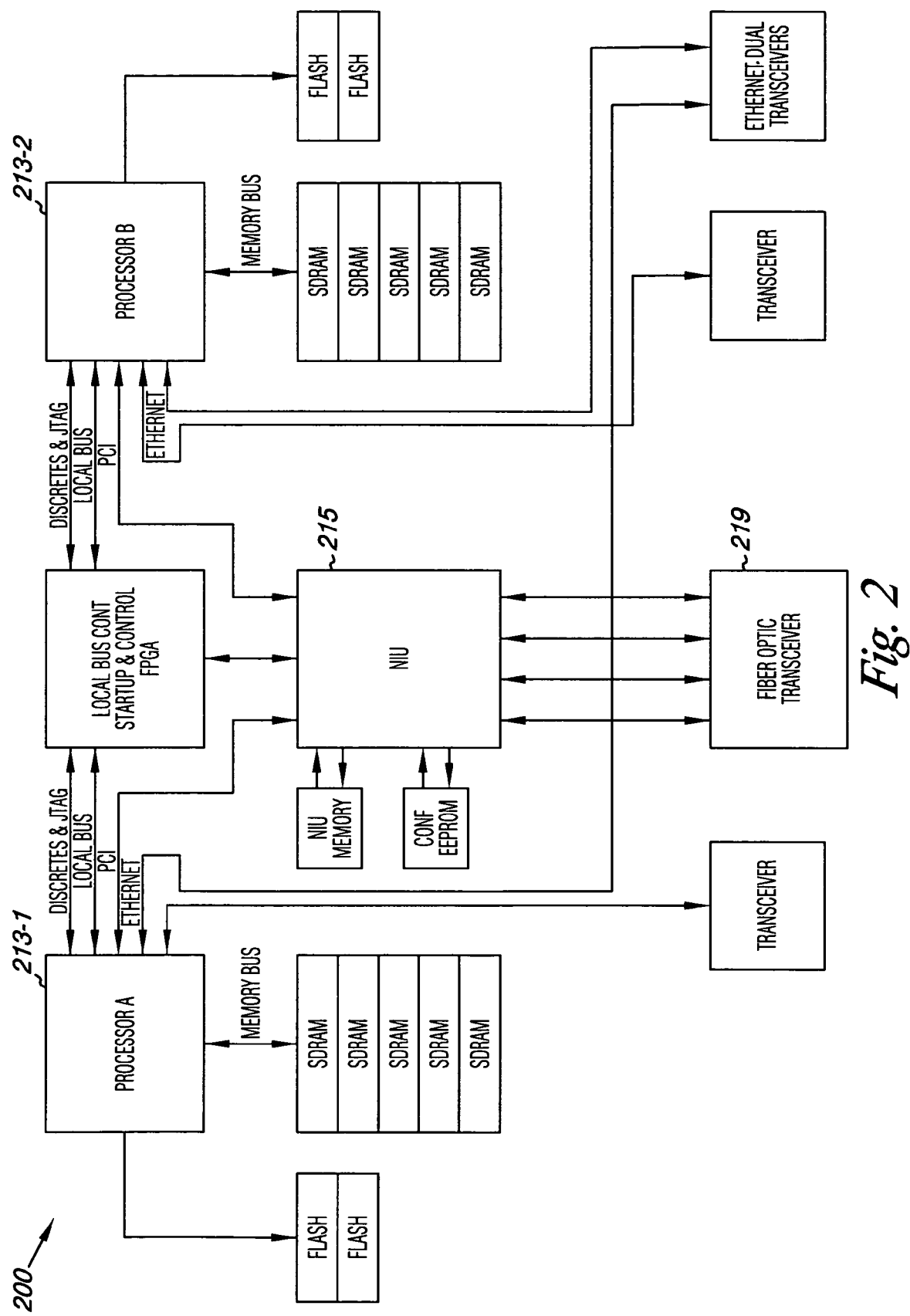
FIG. 2 is a block diagram illustrating a processor communication routing embodiment.

FIG. 2 is a block diagram illustrating processor communication routing in an exemplary network 200 suitable for use with embodiments of the present disclosure. The network 200 includes a first processor 213-1 and a second processor 213-2. The network 200 also includes a network interface unit 215.

The network 200 further includes a network data switch 219, which can, for example, be a fiber optic transceiver. In embodiments of the present disclosure, a network data switch can be a transceiver or another type of switch component. The transceiver or switch can be optical, electrical, or another type, or a combination of these technologies.

The elements of the computing device network 200 can perform various functions. The first processor 213-1 and the second processor 213-2 can each receive, process, and/or transmit various types of information, such as a communication and/or a signal. For example, a processor can receive and/or transmit data through a peripheral component interconnect (PCI), as described in connection with FIG. 3.

The network interface unit 215 can facilitate communication between the first processor 213-1 and the second processor 213-2, such as through interconnects and/or switches in the network interface unit 215, as described further in connection with FIGS. 4A-4C. In various embodiments, the network interface unit 215 can execute instructions to control one or more interconnects and/or switches, to form one or more communications paths for processors and/or devices connected to the network interface unit 215.

In some embodiments, a network device other than the network interface unit 215 can execute instructions, to control one or more interconnects and/or switches in the network interface unit 215. In various embodiments, the interconnects and/or switches can be programmable.

The network data switch 219 can perform various switching functions, such as directing a communication that it receives from a network device to which it is connected. The network interface unit 215 and/or network data switch 219 can receive, process, and/or transmit various types of information, such as a communication and/or a signal.

The elements of the computing device network 200 can be connected in various ways. For example, in the embodiment of FIG. 2, the first processor 213-1 is directly connected to the network interface unit 215 via a PCI communication path (e.g., a 64 bit PCI component). The second processor 213-2 is also directly connected to the network interface unit 215 via a PCI communication path. These connections are considered to be direct in that these communication paths do not include another network device between the elements. As a result of these direct connections, the first processor 213-1 and the second processor 213-2 can each directly communicate with the network interface unit 215.

Communication paths with various communication protocols can be used in embodiments of the present disclosure and embodiments are not limited to the communication protocols shown in FIG. 2. For example, such communication protocols can include AppleTalk, DECnet, IPX/SPX, SMB, SNA, DSA, OSI, and IP, as well as other communication protocols.

In the embodiment illustrated in FIG. 2, the network interface unit 215 is directly connected to the network data switch 219, through a number of fiber optic communication paths or routes. As a result, the network interface unit 215 can communicate with the network data switch 219. As discussed with respect to the switches, in embodiments of the present disclosure, communication paths can be optical, electrical, or another type of communication path, or a combination of these types.

The connections in the computing device network 200 can form various communication paths or routes between the first processor 213-1 and the second processor 213-2. For example, in a similar manner to that of FIG. 1, a communication path from the first processor 213-1 to the second processor 213-2 can include the communication path between the first processor 213-1 and the network interface unit 215, a communication path between the network interface unit 215 and the network data switch 219, a communication path between the network data switch 219 and the network interface unit 215, and a communication path between the network interface unit 215 and the second processor 213-2. In this example, the first processor 213-1 can transmit a communication through this communication path to the second processor 213-2.

In this example, a communication transmitted through this communication path can experience a transmission time delay for a processor communication. In processor communication, a fraction of a nanosecond (a billionth of a second) can be a significant amount of time. A transmission time delay through this communication path can include a travel time delay through the fiber optic cable between the network interface unit 215 and the network data switch 219, a switching time delay through the network data switch 219, and an interconnect time delay through the network interface unit 215 for a second time.

As a result, a transmission through a communication path from the first processor 213-1, to the network interface unit 215, to the network data switch 219, to the network interface unit 215, and to the second processor 213-2 can experience a transmission time delay.

Also as an example, a communication path from the first processor 213-1 to the second processor 213-2 can include the communication path between the first computing device 213-1 and the network interface unit 215 and a communication path between the network interface unit 215 and the second processor 213-2. The first processor 213-1 can also transmit a communication through the communication path of this example to the second processor 213-2. This example communication path can experience a transmission time delay that is less than a transmission time delay for a communication path that also includes fiber optic cable and the network data switch 219, as described in the previous example. Instructions can execute to select this faster communication path for a communication and/or a signal, as described in connection with FIGS. 4-5.

Figure 3:
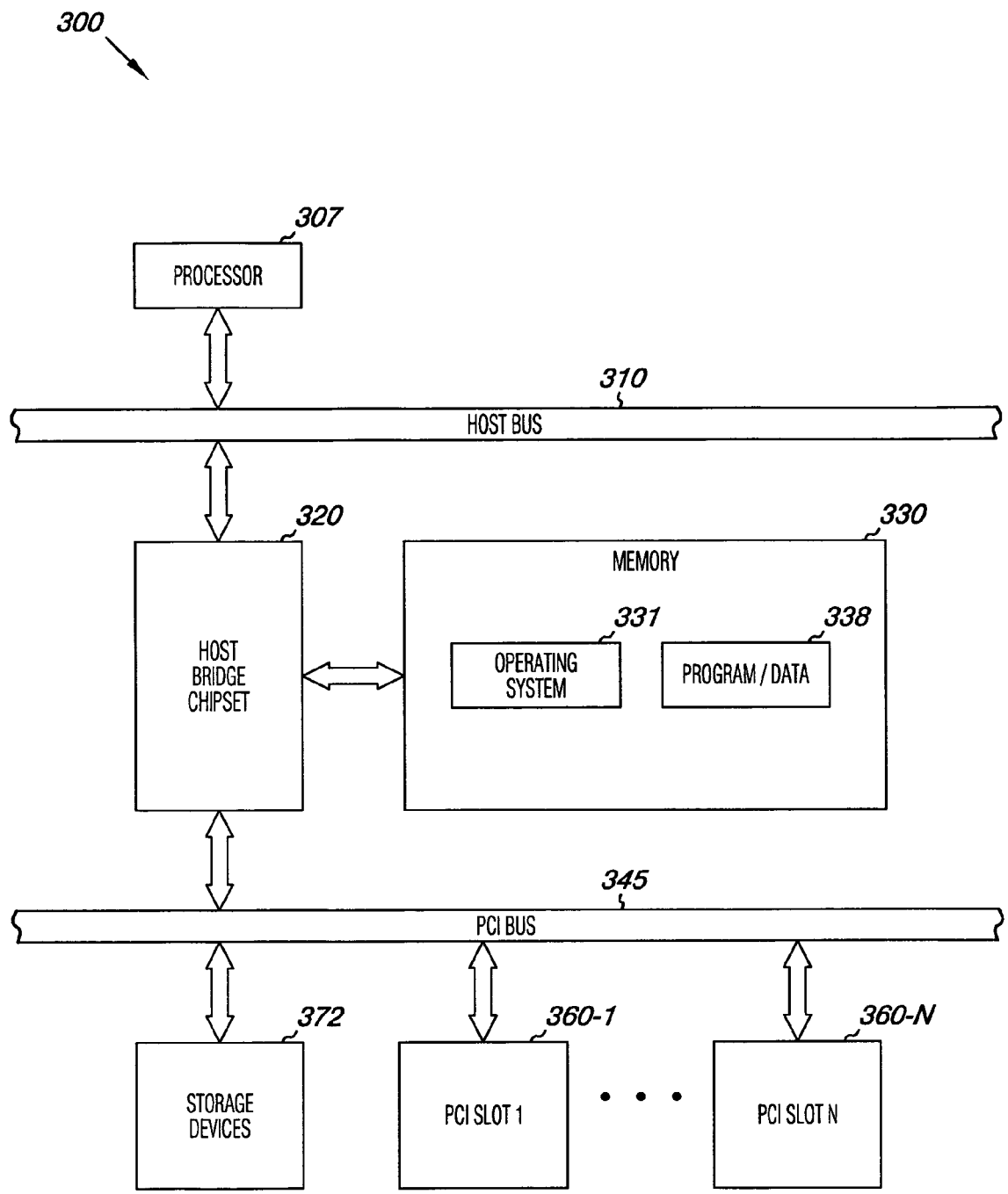
FIG. 3 is a block diagram illustrating communication in an exemplary computing device suitable for use with embodiments of the present disclosure.

FIG. 3 is a block diagram illustrating communication in an exemplary computing device 300 suitable for use with embodiments of the present disclosure. The computing device 300 includes a processor 307, a host bus 310, a host bridge chipset 320, a memory 330, a peripheral component interconnect (PCI) bus 345, "N" (representing any number) PCI slots 360-1 to 360-N (e.g., slots for I/O circuit cards, controller cards, and other removable devices), and one or more storage devices shown generally as 372. The processor 307 represents a processing unit of various architectures and can include more than one processor or logic component as discussed above. The host bridge chipset 320 can include a number of interface circuits to allow the host processor 307 to access the memory 330 and the PCI bus 345.

The memory 330 represents one or more mechanisms for storing information. For example, the memory 330 may include non-volatile and/or volatile memory types. Examples of such memory types include flash memory, read only memory (ROM), random access memory (RAM), etc. Sets of executable instructions and data, including one or more operating systems (OS) 331 and basic input/output systems (BIOS) can be stored in memory 330. Examples of operating systems include Windows, Mac, Unix, Linux, to name a few.

The memory 330 can also include other sets of executable instructions and data 338, such as application programs and other files.

The PCI slots 360-1 to 360-N provide interfaces to a number of PCI components. Examples of PCI devices can include printers, removable disk storage and databases, facsimile devices, scanners, network interface devices, media interface devices, etc. Storage devices 372 can include floppy disks, compact discs, digital video disks, hard drives, etc.

FIG. 4A is a functional diagram illustrating an exemplary computing device network 411 with a network interface unit 413 according to embodiments of the present disclosure. The computing device network 411 includes a first processor 411-1, a second processor 411-2, an Nth processor 411-N (where "N" represents any number), the network interface unit 413, and a network data switch 419. In the computing device network 411, the network interface unit 413 includes an exemplary programmable switch 412. Each of the processors 411-1 through 411-N is connected to the network interface unit 413.

The network interface unit 413 can facilitate communication between each of the processors 411-1 through 411-N, via the switch 412. For ease of reference, in connection with FIGS. 4A-4C, the term switch in the singular can refer to one or more switches in a network interface unit. The functions of the switch 412 also illustrate the functions of an interconnect, which can be used instead of or in addition to a switch to facilitate communication between processors. Instructions can execute to operate the switch 412, to form various communication paths or routes in the computing device network 411, including the path described in connection with the embodiments of FIGS. 4B and 4C. Instructions can also execute to select one or more of these various communication paths or routes for a communication and/or signal.

FIG. 4B is a functional diagram illustrating a computing device network 431 with processor communication routed according to embodiments of the present disclosure. The computing device network 431 includes a first processor 431-1, a second processor 431-2, an Nth processor 431-N (where "N" represents any number), a network interface unit 433, and a network data switch 439. In the computing device network 431, the network interface unit 433 includes a switch 434.

In the embodiment of FIG. 4B, executable instructions have executed to operate the switch 434 to form a communication path from the first processor 411-1, to the network interface unit 413, to the network data switch 419, to the network interface unit 413, and to the second processor 411-2. This communication path can experience a transmission time delay, as described in connection with FIG. 2. Instructions can execute to select the communication path in the computing device network 431 for a communication and/or signal, as described in connection with FIG. 5.

FIG. 4C is a functional diagram illustrating a computing device network 451 with processor communication routed according to embodiments of the present disclosure. The computing device network 451 includes a first processor 451-1, a second processor 451-2, an Nth processor 451-N (where "N" represents any number), a network interface unit 453, and a network data switch 459. In the computing device network 451, the network interface unit 453 includes a programmable switch 456.

In the embodiment of FIG. 4C, executable instructions have executed to operate the switch 454 to form a communication path from the first processor 451-1, to the network interface unit 453, to the network data switch 459, to the network interface unit 453, and to the second processor 451-

2. This communication path can experience a transmission time delay that is less than the transmission time delay described in connection with FIG. 4B. Instructions can execute to select the communication path in the computing device network 451 for a communication and/or signal, as described in connection with FIG. 5.

Figure 5:
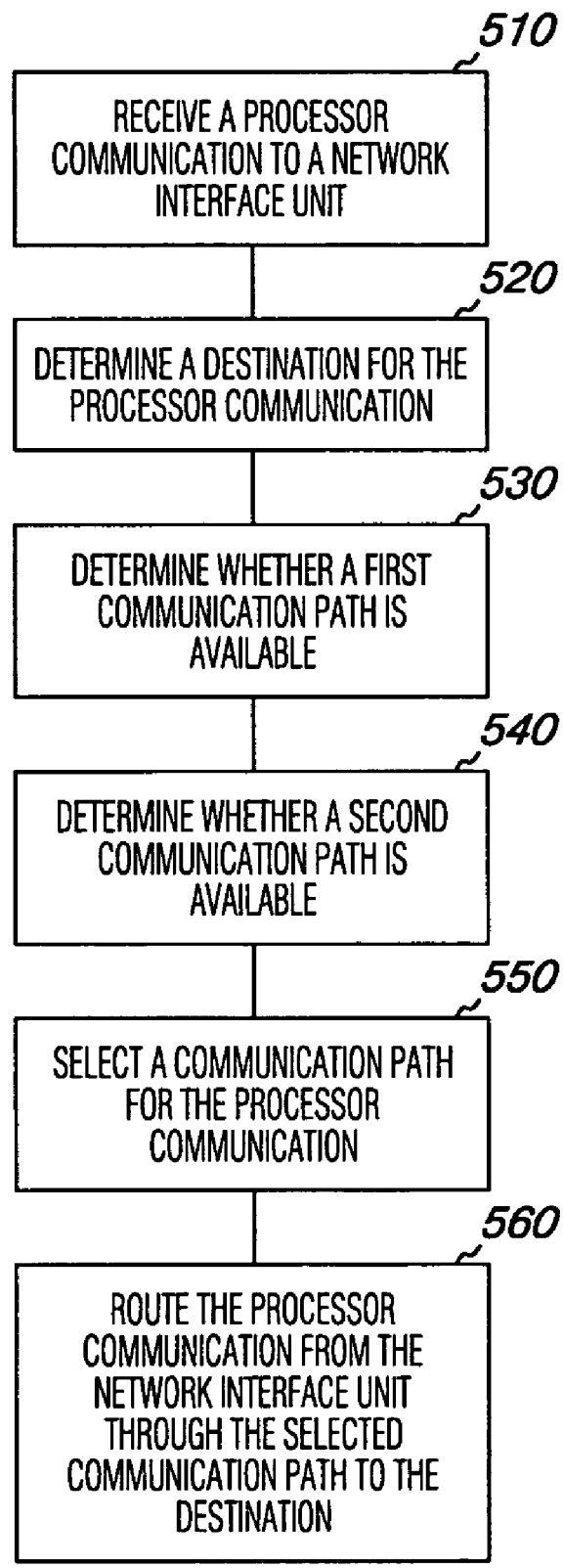
FIG. 5 is a flowchart illustrating a method embodiment for routing processor communications.

FIG. 5 is a flowchart illustrating a method of routing processor communication according to embodiments of the present disclosure. Unless explicitly stated, the method embodiments described herein are not constrained to a particular order or sequence. Additionally, some of the described method embodiments or elements thereof can occur or be performed at the same point in time.

In FIG. 5, at block 510, the method embodiment illustrated includes, receiving a processor communication to a network interface unit. As an example, the processor communication can be transmitted from a processor in a computing device to the network interface unit.

The method embodiment of FIG. 5 also includes, at block 520, determining a destination for the processor communication of block 510. Instructions can execute to determine the destination for a processor communication. For example, instructions can execute to determine the destination by using a destination address in the processor communication. In the embodiment of FIG. 5, a destination can be any of various network devices that are connected to the network interface unit. For example, a destination can be a processor that is directly connected to the network interface unit.

As described in block 530, the illustrated method embodiment includes determining whether a first communication path is available. In some embodiments, instructions can execute to determine whether a communication path is available by using data about the communication path. For example, if a communication path includes a network data switch and the network data switch experiences a failure, then instructions can execute to use data indicating the failure to determine that the communication path is unavailable.

In some embodiments, instructions can execute to determine whether a communication path is available by testing the communication path. For example, if a communication path includes a fiber optic cable, and the fiber optic cable has not experienced a failure, then instructions can execute to transmit a test message through the particular fiber optic cable to determine that the communication path is available. As an example embodiment, instructions can execute to determine whether a first communication path from a first processor, to a network interface unit, to a network data switch, to the network interface unit, and to a second processor is available.

At block 550, the method embodiment of FIG. 5 includes determining whether a second communication path is available. This determination can be performed as described in connection with block 540. As an example embodiment, instructions can execute to determine whether a second communication path from a first processor, to a network interface unit, and directly to a second processor is available.

The method embodiment of FIG. 5 also includes, at block 550, selecting a communication path for the processor communication of block 510. Instructions can execute to select the communication path based, in part or in whole, on a determination of a destination for the processor communication, such as the determination described in connection with block 520. Instructions can execute to select the communication path based, in part or in whole, on a determination of whether a communication path is available, such as the determination described in connection with blocks 530 and 540. Instructions can execute to select the communication path based, in part or in whole, on a determination of a particular communication path or route through which the processor communication is originally routed.

For example, if a processor communication is destined for a processor that is directly connected to the network interface unit and the processor communication is originally routed through a network data switch, if a communication path directly from the network interface unit to the processor is available, then, after determining these facts about the processor communication, instructions can execute to select a communication path from the network interface unit directly to the processor, and reroute the processor communication to the selected communication path. In such embodiments, the method can include transmitting the processor communication (e.g., block 510) from the network interface unit through the communication path (e.g., selected at block 550) to a destination (e.g., determined at block 520).

Although specific embodiments have been illustrated and described herein, those of ordinary skill in the art will appreciate that any arrangement calculated to achieve the same techniques can be substituted for the specific embodiments shown. This disclosure is intended to cover adaptations or variations of various embodiments of the present disclosure. It is to be understood that the above description has been made in an illustrative fashion, and not a restrictive one.

Combination of the above embodiments, and other embodiments not specifically described herein will be apparent to those of ordinary skill in the art upon reviewing the above description. The scope of the various embodiments of the present disclosure includes various other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the present disclosure have more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

What is claimed:

1. A method for routing a processor communication comprising:

determining whether a communication received from a first processor connected via a first independent electrical communication path directly to an electrical network interface unit is intended for a second processor connected via a second independent electrical communication path directly to the electrical network interface unit, or a third processor;

if the communication is intended for the second processor:

selecting one communication route from at least two routes through which to route the communication from the electrical network interface unit to the second processor including:

a first route to and from an optical switch via a number of optical communication paths directly between the optical switch and the electrical network interface unit and to the second processor via the second independent electrical communication path, and a second route, neither to nor from the optical switch, directly to the second processor via the second independent electrical communication path; and routing the communication from the electrical network interface unit to the second processor through the selected communication route;

if the communication is intended for the third processor, determining whether a route from the first processor to the optical switch is available, and:

if the route from the first processor to the optical switch is unavailable, determining whether a route from the second processor to the optical switch is available; and if the route from the second processor to the optical switch is available, routing the communication to the optical switch via the second processor, and then to the third processor.

2. The method of claim 1, wherein determining includes determining whether the communication received from the first processor in a first computing device that is connected via a first independent electrical communication path directly to the electrical network interface unit is intended for the second processor in a second computing device that is connected via a second independent electrical communication path directly to the electrical network interface unit.

3. The method of claim 1, wherein selecting includes selecting the second route from the electrical network interface unit directly to the second processor, based, at least in part, on the determination that the communication is intended for the second processor.

4. The method of claim 1, wherein the method includes determining whether the first route from the electrical network interface unit to and from the optical switch to the second processor is available; and selecting the second route from the electrical network interface unit directly to the second processor, based, at least in part, on the determination that the first route is unavailable.

5. The method of claim 4, wherein determining includes determining that the first route from the electrical network interface unit to and from the optical switch and through another network device to the second processor is unavailable.

6. The method of claim 5, wherein determining includes determining that the first route from the electrical network interface unit to and from the optical switch and through another optical switch to the second processor is unavailable.

7. The method of claim 1, wherein the method includes changing a destination address when the communication route is selected.

8. A computing device readable physical medium having instructions stored thereon and executable by a processor for causing a device to perform a method, comprising:

determining whether a processor communication from a first processor that is directly connected to an electrical network interface unit via a first independent electrical communication path is routed to a second processor that is directly connected to the electrical network interface unit via a second independent electrical communication path or a third processor;

if the processor communication is routed to the second processor:

determining that the processor communication is routed on a first route that travels into and out of the electrical network interface unit at least twice and to and from an optical switch at least once; and rerouting the processor communication to a second route that travels into and out of the electrical network interface unit only once and neither to nor from the optical switch;

if the processor communication is routed to the third processor, determining whether a route from the first processor to the optical switch is available, and:

if the route from the first processor to the optical switch is unavailable, determining whether a route from the second processor to the optical switch is available; and if the route from the second processor to the optical switch is available, routing the processor communication to the optical switch via the second processor, and then to the third processor.

9. The medium of claim 8, wherein the method includes determining that the second route is available.

10. The medium of claim 8, wherein determining that the processor communication is routed to the second processor includes using a destination address in the processor communication.

11. The medium of claim 10, wherein rerouting includes changing the destination address in the processor communication.

12. An electrical network interface device, comprising:

a device processor;

a memory, connected to the device processor; and executable instructions storable in the memory and executable by device the processor to:

receive a signal from a first processor that is directly connected to the electrical network interface device via a first independent electrical communication path, wherein the signal is routed from the electrical network interface device to an optical switch;

determine whether the signal is routed to a second processor that is directly connected to the electrical network interface device via a second independent electrical communication path or a third processor;

reroute the signal from the electrical network interface device directly to the second processor and not to the optical switch if the signal is routed to the second processor;

if the signal is routed to the third processor, determine whether a route from the first processor to the optical switch is available, and:

if the route from the first processor to the optical switch is unavailable, determine whether a route from the second processor to the optical switch is available; and if the route from the second processor to the optical switch is available, route the processor communication to the optical switch via the second processor, and then to the third processor.

13. The device of claim 12, wherein the device processor is a field programmable gate array.

14. The device of claim 12, wherein the device processor is an application specific integrated circuit.

15. The device of claim 12, wherein the device processor is a configurable microcontroller.

16. The device of claim 12, wherein the device processor is a complex programmable logic device.

17. A system, comprising:

a first computing device with a first processor;

a second computing device with a second processor;

a third computing device with a third processor;

an optical network data switch;

an electrical network interface unit in communication with and directly coupled to the first processor via a first electrical communication path, the second processor via a second electrical communication path, and the optical network data switch via an optical communication path, wherein the electrical network interface unit includes:

a fourth processor;

a memory, connected to the fourth processor; and executable instructions storable in the memory and executable by the fourth processor to:

determine whether a communication transmitted by the first processor is routed to the second processor or a third processor;

if the communication is routed to the second processor:
  identify that the communication transmitted by the first processor is routed from the electrical network interface unit to the optical network data switch and from the optical network data switch to the second processor via the electrical network interface unit; and
  redirect the communication directly from the electrical network interface unit to the second processor and neither to nor from the optical network data switch;

if the communication is routed to the third processor, determine whether a route from the first processor to the optical switch is available, and:

if the route from the first processor to the optical switch is unavailable, determine whether a route from the second processor to the optical switch is available; and if the route from the second processor to the optical switch is available, route the communication to the optical switch via the second processor, and then to the third processor.

18. The system of claim 17, wherein the electrical network interface unit includes:

a programmable interconnect; and executable instructions storable in the memory and executable by the fourth processor to redirect the communication directly from the electrical network interface unit to the second processor by using the programmable interconnect.

19. The system of claim 17, wherein the electrical network interface unit includes:

a programmable switch; and executable instructions storable in the memory and executable by the fourth processor to redirect the communication directly from the electrical network interface unit to the second processor by using the programmable switch.

* * * * *